(12) United States Patent
Höpner et al.

(10) Patent No.: US 10,906,686 B2
(45) Date of Patent: Feb. 2, 2021

(54) SEALING DEVICE

(71) Applicant: MULTIVAC Sepp Haggenmüller SE & Co. KG, Wolfertschwenden (DE)

(72) Inventors: Bernd Höpner, Kempten (DE); Lars Ickert, Kempten (DE)

(73) Assignee: Multivac Sepp Haggenmüller SE & Co. KG, Wolfertschwenden (DE)

(*) Notice: Subject to any disclaimer, the term of this patent is extended or adjusted under 35 U.S.C. 154(b) by 134 days.

(21) Appl. No.: 15/965,336

(22) Filed: Apr. 27, 2018

(65) Prior Publication Data
US 2018/0312288 A1 Nov. 1, 2018

(30) Foreign Application Priority Data

Apr. 28, 2017 (DE) .................. 10 2017 109 211

(51) Int. Cl.
 B65C 9/06 (2006.01)
 B65B 35/58 (2006.01)
 (Continued)

(52) U.S. Cl.
 CPC .............. B65C 9/067 (2013.01); B29C 65/18 (2013.01); B29C 65/305 (2013.01);
 (Continued)

(58) Field of Classification Search
 CPC .. B65C 9/067; B65C 9/46; B65C 9/02; B65B 35/58; B65B 61/02; B65B 61/14; B65B 25/04; B65B 7/2878; B65B 7/164; B65B 41/12; B65B 59/00; B65B 61/202; B65B 51/14; B65B 65/003; B65B 65/00; B65B 9/04; B65B 5/02; B65B 5/04;
 (Continued)

(56) References Cited

U.S. PATENT DOCUMENTS 3,029,007 A * 4/1962 Hepner ................... B29C 51/18
226/173
3,390,042 A * 6/1968 Der Meulen ........... B31B 70/00
156/583.5
(Continued)

FOREIGN PATENT DOCUMENTS

DE 29917251 U1 2/2000
DE 102005039673 A1 11/2006
(Continued)

*Primary Examiner* — Thomas M Wittenschlaeger
(74) *Attorney, Agent, or Firm* — Husch Blackwell LLP

(57) ABSTRACT

The sealing device for packages that includes a control unit, a sealing station, an unwinder for a film web, a cutting device provided upstream of the sealing station and used for producing film sections of the film web, a film feed device for feeding the film sections to the sealing station, a conveying device for conveying packages into the sealing station. Preferably, the packages include food packed in a gas-tight manner. Further, the sealing station may comprise upper and lower sealing elements that are configured for clamping the package and the film section in common between the lower and upper sealing elements and for sealing the film section onto the package. The sealing device may also include the sealing elements being adapted to be synchronously moved along with the continuously moving package during the sealing process.

8 Claims, 3 Drawing Sheets

(51) Int. Cl.
| | |
|---|---|
| *B65B 41/12* | (2006.01) |
| *B65B 61/02* | (2006.01) |
| *B65B 7/16* | (2006.01) |
| *B65C 9/02* | (2006.01) |
| *B65C 9/46* | (2006.01) |
| *B29C 65/78* | (2006.01) |
| *B29C 65/00* | (2006.01) |
| *B65B 61/20* | (2006.01) |
| *B29C 65/18* | (2006.01) |
| *B29C 65/30* | (2006.01) |
| *B65B 61/14* | (2006.01) |
| *B65B 59/00* | (2006.01) |
| *B65B 25/04* | (2006.01) |
| *B65B 7/28* | (2006.01) |
| *B65B 51/14* | (2006.01) |

(52) U.S. Cl.
CPC ........ *B29C 65/787* (2013.01); *B29C 65/7847* (2013.01); *B29C 65/7894* (2013.01); *B29C 66/112* (2013.01); *B29C 66/131* (2013.01); *B29C 66/53461* (2013.01); *B29C 66/83543* (2013.01); *B29C 66/849* (2013.01); *B29C 66/84121* (2013.01); *B29C 66/84123* (2013.01); *B65B 7/164* (2013.01); *B65B 35/58* (2013.01); *B65B 41/12* (2013.01); *B65B 59/003* (2019.05); *B65B 61/02* (2013.01); *B65B 61/14* (2013.01); *B65B 61/202* (2013.01); *B65C 9/02* (2013.01); *B65C 9/46* (2013.01); *B65B 7/2878* (2013.01); *B65B 25/04* (2013.01); *B65B 51/14* (2013.01)

(58) Field of Classification Search
CPC ... B65B 59/003; B29C 65/305; B29C 65/787; B29C 65/18; B29C 65/7847; B29C 65/7894; B29C 66/112; B29C 66/53461; B29C 66/84121; B29C 66/849; B29C 66/131; B29C 66/83543; B29C 66/84123
See application file for complete search history.

(56) References Cited

U.S. PATENT DOCUMENTS

| | | | | |
|---|---|---|---|---|
| 3,526,169 A * | 9/1970 | Levenson, Jr. | ......... | B31B 70/00 493/197 |
| 3,650,773 A * | 3/1972 | Bush | ..................... | B65B 61/025 426/383 |
| 4,069,645 A * | 1/1978 | Vetter | ..................... | B29C 51/26 53/511 |
| 4,244,772 A * | 1/1981 | Achelpohl | ........ | B29C 66/81431 156/515 |
| 4,362,593 A * | 12/1982 | Grevich | .................. | B29C 65/18 156/498 |
| 4,991,375 A * | 2/1991 | Raque | .................... | B65B 7/2878 53/329 |
| 4,996,826 A * | 3/1991 | Pfaffmann | ........ | B29C 66/53461 53/478 |
| 5,269,123 A * | 12/1993 | Marchesini | ............. | B29C 65/18 53/329.4 |
| 6,035,615 A * | 3/2000 | Hansson | ........... | B29C 66/72321 53/551 |
| 6,739,110 B2 * | 5/2004 | Ogden | .................. | B65B 61/025 53/397 |
| 7,481,033 B2 * | 1/2009 | Ouellette | .................. | B65B 9/02 53/209 |
| 7,607,281 B2 * | 10/2009 | Freddi | ..................... | B65B 7/164 53/281 |
| 10,259,603 B2 * | 4/2019 | Palumbo | .................. | B65B 11/52 |
| 2007/0220833 A1 * | 9/2007 | Freddi | .................. | B65B 7/164 53/452 |
| 2008/0289303 A1 * | 11/2008 | Nemkov | ................ | B65B 51/30 53/552 |
| 2011/0083810 A1 * | 4/2011 | Lin | ......................... | B65B 25/04 156/497 |
| 2016/0068288 A1 * | 3/2016 | Palumbo | ................ | B65B 51/02 53/511 |
| 2016/0185090 A1 * | 6/2016 | Leonelli | ............... | B29C 66/849 156/583.5 |
| 2017/0283102 A1 * | 10/2017 | Strauch | ................ | B65B 25/001 |
| 2018/0178932 A1 * | 6/2018 | Palumbo | ................ | B65B 65/003 |
| 2019/0055040 A1 * | 2/2019 | Capitani | ............... | B65B 31/043 |

FOREIGN PATENT DOCUMENTS

| | | |
|---|---|---|
| DE | 102005039690 A1 | 11/2006 |
| EP | 1118542 A1 | 7/2001 |
| EP | 3023339 A1 | 5/2016 |
| GB | 2219550 A | 12/1989 |
| WO | 2014091504 A1 | 6/2014 |
| WO | 2014166940 A1 | 10/2014 |
| WO | 2016199050 A1 | 12/2016 |

* cited by examiner

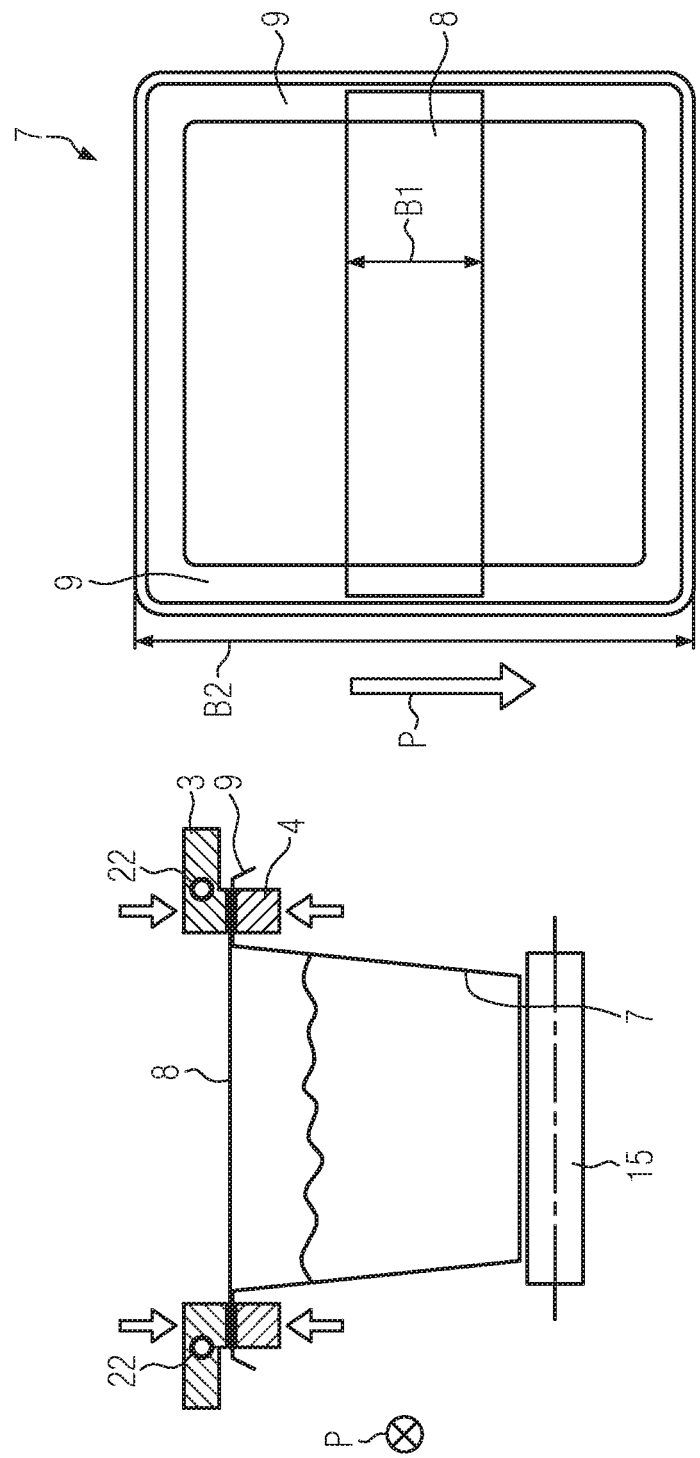

SEALING DEVICE

CROSS-REFERENCE TO RELATED APPLICATIONS

This Application claims priority to German Patent Application No. 10 2017 109 211.0, filed on Apr. 28, 2017, to Bernd Hopner and Lars Ickert, currently pending, the entire disclosure of which is incorporated herein by reference.

FIELD OF THE INVENTION

The invention relates to a sealing device having sealing elements that are adapted to be synchronously moved along with the continuously moving package during the sealing process.

BACKGROUND OF THE INVENTION

EP 3023339 A1 discloses a sealing device for sealing a film strip together with a cover film onto a tray and, subsequently, cutting both films along the tray edge, so that the film strip serves as a carrying aid for the package and the cover film wraps the product in the tray in a gas-tight manner. The film strip is here oriented in the conveying direction of the trays. The subsequent cutting of both films outside the tray edge does not satisfy optical demands in a particularly advantageous manner, since the films project outwards beyond the sealed seam.

WO 2014/091504 A1 shows a tray sealer, in the case of which film sections are cut out of a film web in a waste-free manner, which are then supplied to the sealing device for sealing trays. These film sections are provided as a cover film for gas-tight sealing of a respective tray and are circumferentially sealed onto the tray edge. The film section will here project only to a minimum extent, or not at all.

For applying information, such as a special product weight and a resultant retail price, to a package, it is common practice to dispense printed labels onto the package. The application of such labels is unproblematic as far as packages having an even cover film are concerned. Skin packs exhibiting an uneven film profile may e.g. be identified by special labels extending across the upper surface and two opposed lateral surfaces down to the lower surface, as known from EP 1118542. In the case of skin packs, the cover film fits around the product as well as the inner sides of the tray among other areas.

SUMMARY OF THE INVENTION

It is the object of the present invention to provide a device for applying narrow, web-shaped materials to packages, such as in particular skin packs, the web-shaped materials comprising preferably information on weight and price.

The sealing device according to the present invention comprises a control unit, a sealing station, an unwinder for a film web, a cutting device provided upstream of the sealing station and used for producing film sections of the film web, a film feed device for feeding the film sections to the sealing station, and a conveying device for conveying packages, in which preferably food may be packed in a gas-tight manner. The sealing station comprises upper and lower sealing elements, which are configured for clamping the package and the film section in common between the lower and upper sealing elements and for sealing the film section onto the package. The sealing device according to the present invention may be characterized in that the sealing elements are adapted to be synchronously moved along with the continuously moving package during the sealing process. It follows that, other than is normally the case, the packages need not be stopped for the sealing process. This leads to an increase in performance. Using this sealing device according to the present invention it may be possible to cut off narrow film sections from a respective film web in a waste-free manner and to seal them onto packages without the film projecting beyond a sealed seam. Indications of weight and price can here be printed onto the film web using a printer already upstream of the cutting station.

Preferably, the film feed device comprises a plurality of belts, preferably round belts or flat belts, so that film sections can be conveyed in a suspended condition. The film feed device comprises a suction device, so that the film sections can be held on the lower surface of the belts themselves while they are being conveyed. Alternatively, also a flat belt with openings may be provided. In this case, the suction device may be effective through the openings and holds the film section in this way.

According to a particularly advantageous embodiment, a weighing device may be provided for dynamically weighing individual packages, so that these packages, which may contain foods of different weights such a meat, can be priced with a retail price.

Preferably, a printer may be provided for printing product information, codes or indications of weight and price onto the film web or the film sections. The printed film section may thus replace a printed label, which could normally not, or only with great effort be applied to the visible side of skin packs.

The sealing elements are normally shorter than the edges of the packages onto which the film section may be sealed. This represents an embodiment which may be particularly simple from the structural point of view and which can therefore be realized at a reasonable price, said embodiment being, in addition, independent of the shape of the outer region of the tray edge.

According to a particularly suitable embodiment, a displacement unit may be provided for moving the sealing elements along the production direction. In this way, the sealing process can take place during the conveying movement of the packages, start and stop periods are avoided and the production performance may be increased. The displacement unit has preferably a servo drive or a linear drive, in order to allow the movement of the sealing elements to be synchronized with the movement of the package using the control unit as quickly and as precisely as possible.

Preferably, at least the lower sealing elements are movable vertically or towards the respective upper sealing elements using one or a plurality of adjustment drives, so as to allow the sealing elements to be displaced between an open position for moving back the sealing elements in a direction opposite to the production direction using the displacement unit and a closed position. Optionally, also the upper sealing elements may additionally be provided with one or a plurality of adjustment drives, so that they can be moved into contact with the package in a vertical direction.

In the case of a particularly suitable sealing device, the latter comprises a transverse adjustment facility and/or a vertical adjustment facility so as to adjust the sealing elements to various geometries of packages. This leads to a higher flexibility as regards the packages to be processed.

The method according to the present invention, which may be used for operating the sealing device for applying a film section having a width that may be smaller than the width of the package onto which the film section may be sealed, and for sealing the film section only onto two opposed edges of the package, may be characterized in that the upper sealing elements and the lower sealing elements are moved during the sealing process at a common synchronous speed together with the film section and the package in the production direction. The sealing process can thus be executed during conveyance and inefficient process time for stopping and restarting can be avoided. Preferably, products, such as a foodstuff, have already been packed in the package in a gas-tight manner prior to applying the film section. In particular, the package may, within the framework of the present invention, be a skin pack, i.e. a package sealed with a skin film in a gas-tight manner.

Preferably, the control unit comprises a line motion control for tracking the position of the film sections and of the packages so as to control and/or monitor the bringing together of a film section and of the associated package. In this way, it can be ensured that, during pricing, the weight of a package and the film section with the associated indication of weight and price are correctly brought together in the sealing device.

Preferably, the film section may be sealed in transverse orientation onto the right and the left edge of the package when seen in the production direction, so as to allow a simple structural design of the sealing bars, which are also displaced in a simple manner after the sealing process in a direction opposite to the production direction, so as to be ready for use for the next package.

According to a particularly advantageous embodiment, each package may be weighed before it is supplied to the sealing station, and the weight may be transmitted to the control unit, so that the package can be priced.

Preferably, a printer prints product information, codes or indications of weight and price onto each film section or onto the film web, these indications being preferably transmitted to the printer by the control unit.

The film sections are preferably cut off from a film web using a cutting device, so as to supply them then to the sealing station. This allows e.g. adaptations to packages of different widths.

The film sections may be supplied to the film feed device in transverse orientation in the direction of production or in longitudinal orientation transversely to the direction of production.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show:

FIG. 3 is a schematic end view of one embodiment of a sealing device in accordance with the teachings of the present disclosure, looking in the production direction and illustrating the sealing elements; and FIG. 4 is a schematic a top view of one embodiment of a package having a film section sealed thereon by one embodiment of a sealing device in accordance with the teachings of the present disclosure.

DETAILED DESCRIPTION OF THE INVENTION

Figure 1:
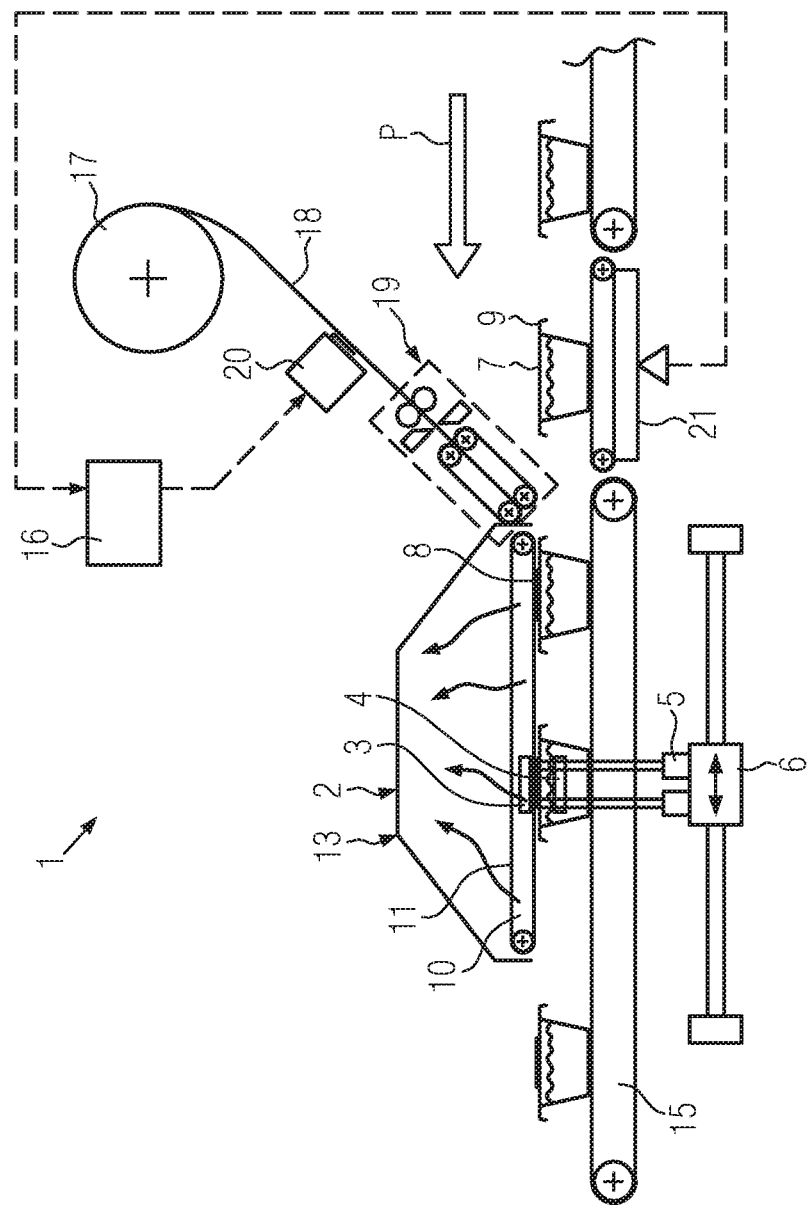
FIG. 1 is a schematic side view of one embodiment of a sealing device in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a sealing device 1 according to the present invention, which comprises a sealing station 2. The sealing station 2 comprises upper sealing elements 3 and lower sealing elements 4, which, on the one hand, are vertically movable relative to one another to a sealing position using adjustment drives 5 and which, on the other hand, are displaceable in common along a production direction P using a displacement unit 6. Alternatively, also the lower sealing elements 4 alone may be vertically movable so that they can be moved to the sealing position. At the sealing position, the upper 3 and the lower sealing elements 4 clamp a package 7 and a film section 8 in position against one another. Since the upper 3 and/or lower sealing elements 4 are heatable, the film section 8 is sealed onto a part of a circumferential edge 9 of the package 7 during the sealing process. The displacement unit 6 may be configured e.g. as an electrically operated linear drive, a spindle drive or as a servo-driven belt drive. The adjustment drives 5 may e.g. be configured as pneumatic cylinders. The sealing elements 3, 4 may be exchangeable for retooling the sealing device 1 for different widths of the film section 8.

Figure 2:
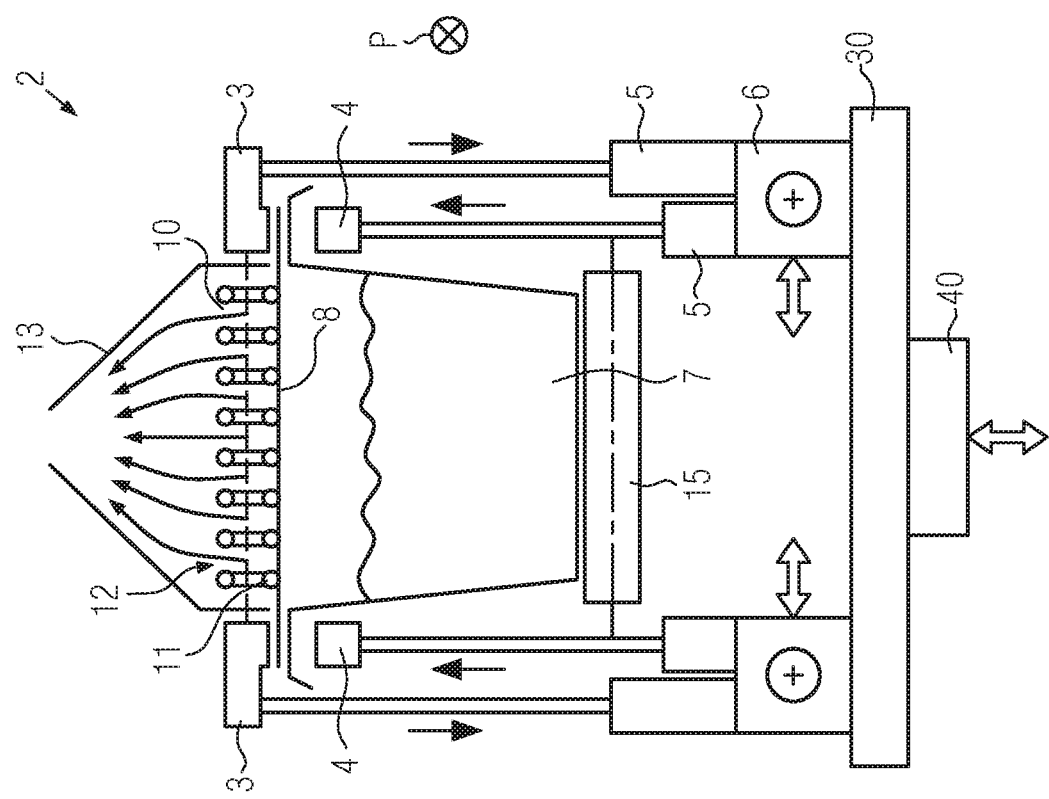
FIG. 2 is a schematic end view of one embodiment of a sealing device in accordance with the teachings of the present disclosure, looking in the production direction.

The film section 8 is conveyed in transverse orientation using a film feed device 10 along the sealing station 2 parallel to or almost parallel to the displacement unit 6 of the sealing elements 3, 4. In the embodiment shown, the film feed device 10 comprises, as shown in FIG. 2, a plurality of round belts 11. Through the gap 12, which exists between the round belts 11, a suction device 13 produces an effect of such a nature that the upper side of the film section 8 is held on the lower belt span of the round belts 11, which is moved in the production direction P. The packages 7 are supplied using a conveying device 15, e.g. in the form of a conveyor belt, parallel to the displacement unit 6 in the production direction P of the sealing station 2. A control unit 16 is configured to adjust the speeds of the displacement unit 6 and of the film feed device 10 to the conveying device 15 such that the relative position of the film section 8 to the package 7 is established and all three speeds are synchronized relative to one another at least during the sealing process.

The sealing device 1 additionally comprises an unwinder 17 for a film web 18. The unwinder 17 and the film feed device 10 have provided between them a cutting device 19 for producing individual film sections 8. Optionally, a printer 20 may be provided between the unwinder 17 and the cutting device 19, so as to apply product information, codes and/or indications of weight and price to the film web 18. The separate film sections 8 can be taken over by the film feed device 10 from the cutting device 19 and conveyed to the sealing station 2.

Upstream of the conveying device 15 for the packages 7, a weighing device 21 may optionally be provided for dynamically weighing individual packages 7 during continuous conveyance. The weight determined in this way is transmitted to the control unit 16, which, in turn, calculates a product weight and a corresponding price via stored specifications and transmits this information to the printer. A line motion control provided in the control unit 16 ensures that the information of a weighed package 7 is printed onto the film web 18 and that this package 7 and the respective film section 8 are brought together in the sealing station 2 and sealed to one another using the sealing elements 3, 4. Also, sensors for detecting the individual packages 7 and/or the individual film sections 8 may be provided along the sealing device 1, so as to make this information available to the control unit 16 for the line motion control.

FIG. 2 shows the sealing station 2 in the production direction P. Due to the suction effect of the suction device 13, the film section 8 is held on the round belts 11 of the film feed device 10 and conveyed such that reliable processing is ensured. The package 7 is moved on the conveying device 15 in synchronism with the film section 8 as soon as the position of the film section 8 relative to the package 7 corresponds to the desired sealing position. The upper sealing elements 3 and the lower sealing elements 4 are at an open position in this representation. Shortly before the sealing process, the sealing elements 3, 4 move together with the package 7 and the film section 8 via the displacement unit 6, which is synchronized with the conveying device 15 and/or the film feed device 10. Then, the sealing elements 3, 4 move towards one another to a closed position, so as to clamp the film section 8 onto the package 7 by moving the lower sealing elements 4 upwards and the upper sealing elements 3 downwards using individual or joint adjustment drives 5.

The film feed device 10, the conveying device 15 and the displacement unit 6 can be synchronized by controlling the respective drives, which are not shown in detail, by the control unit 16.

The displacement unit 6 comprises a transverse adjusting facility 30 for adjusting the opposed sealing elements 3, 4 relative to one another in a direction transversely to the production direction P, so that the sealing device 1 can be adapted to different widths of packages 7. The displacement unit 6 is also vertically adjustable using a vertical adjustment facility 40 so as to allow an adjustment to different package heights or edges 9 of the packages 7.

FIG. 3 shows the closed position, at which the film section 8 is forced under pressure onto the edge 9 of the package 7 at two opposed sides, on the right and on the left when seen in the production direction P, and a necessary thermal energy is applied through the heated upper sealing elements 3 for sealing the film section 8 onto the edge 9 on both sides. Subsequently, the sealing elements 3, 4 move away from one another to the open position to such an extent that the package 7 together with the film section 8 sealed thereon can be advanced in the production direction P using the conveying device 15. The upper sealing elements 3 are each adapted to be heated using a heating device 22, e.g. in the form of heating cartridges.

FIG. 4 shows a top view of a package 7 having a film section 8 sealed thereon. The width B1 of the film section 8 is narrower than the width B2 of the package 7 in the production direction P, i.e. measured in the same direction as the width of the film section 8.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for operating a sealing device comprising a control unit for applying a film section having a width that is smaller than a width of a package onto which the film section is sealed, and for sealing the film section only onto two opposed edges of the package, the method comprising the steps of:
   moving one or more upper sealing elements and one or more lower sealing elements of a sealing station during a sealing process at a common synchronous speed together with the film section and the package in a production direction;
   sealing the film section only onto a first edge and a second edge of the package, wherein the first edge and the second edge oppose each other and are generally parallel to the production direction; and
   cutting off the film section from a film web using a cutting device provided upstream of the sealing station.

2. The method according to claim 1, further comprising the step of tracking the position of the film section and of the package using a line motion control of the control unit such that the bringing together of the film section and of the package is controlled and/or monitored.

3. The method according to claim 1, further comprising the steps of weighing the package to determine a package weight before it is supplied to the sealing station, and transmitting the package weight to the control unit.

4. The method according to claim 3, further comprising the step of printing indications of one of the package weight or a package price onto the film section or onto a film web using a printer.

5. The method according to claim 4, further comprising the step of transmitting the indications to the printer using the control unit prior to said printing step.

6. The method of claim 1, wherein the cutting off the film section from a film web step defines the width of the film section.

7. A method for operating a sealing device, the method comprising the steps of:
- applying a film section onto a package, wherein the film section has a width in a production direction that is smaller than a width of the package in the production direction, and wherein the film section is applied such that the film section does not overlap a first edge and a second edge of the package, wherein the first edge and the second edge oppose each other and are generally transverse to the production direction;
- moving one or more upper sealing elements and one or more lower sealing elements during a sealing process at a common synchronous speed together with the film section and the package in the production direction; and
- sealing the film section only onto a third edge and a fourth edge of the package, wherein the third edge and the fourth edge oppose each other and are generally parallel to the production direction.

8. The method of claim 7 further comprising the step of cutting off the film section from a film web to define the width of the film section using a cutting device disposed upstream of the sealing station.

* * * * *